Figure 1:
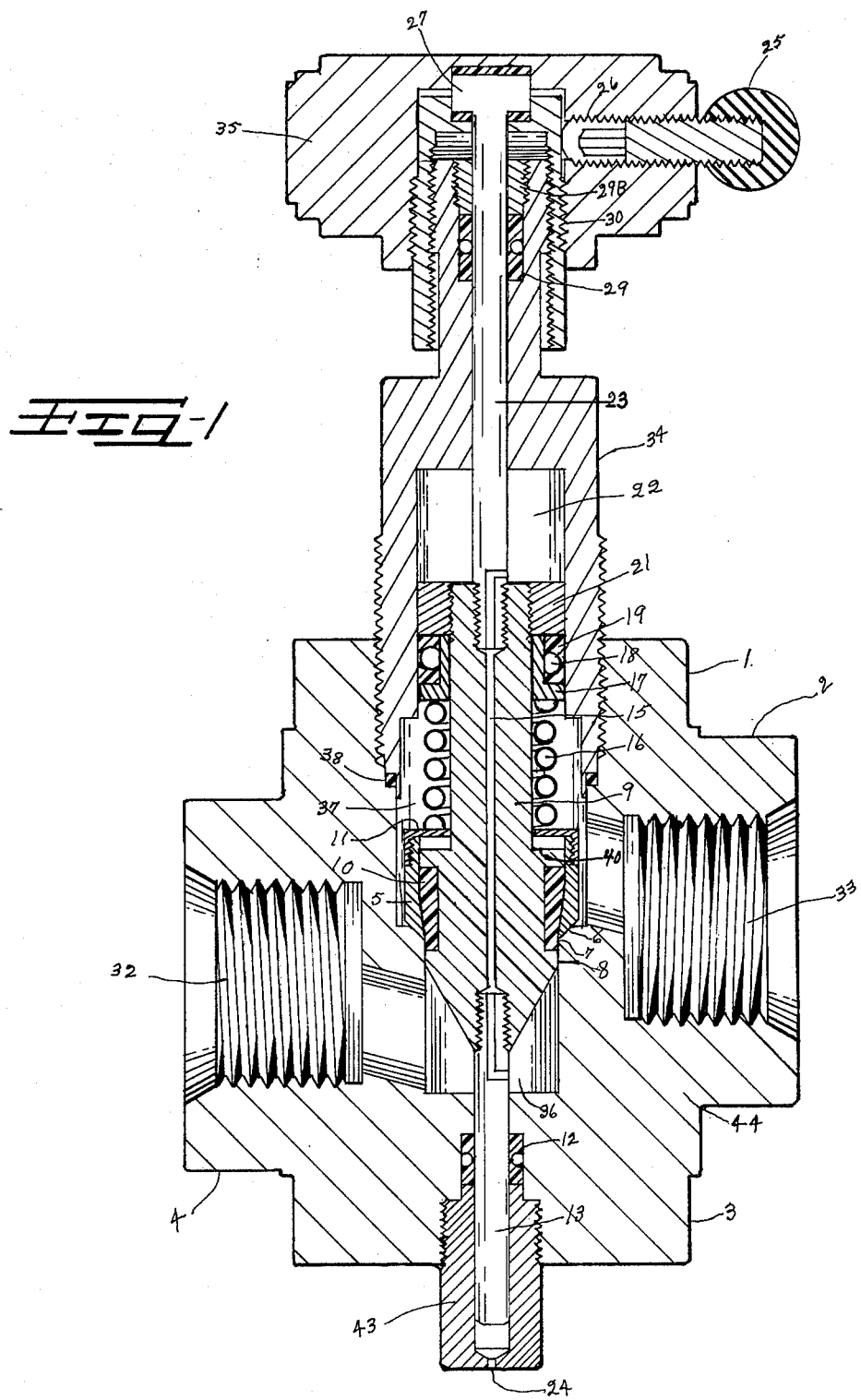

United States Patent [19]

Banks

[11] 4,341,370
[45] Jul. 27, 1982

[54] HIGH PRESSURE, THREE STAGE, BALANCED VALVE

[76] Inventor: George W. Banks, 24824 43rd Ave., S. Kent, Wash. 98031

[21] Appl. No.: 208,670

[22] Filed: Nov. 20, 1980

[51] Int. Cl.³ .............................................. F16K 39/02
[52] U.S. Cl. ................................... 251/282; 251/273; 251/332; 74/552
[58] Field of Search ............... 251/282, 332, 264, 273; 16/110 R; 74/552

[56] References Cited

U.S. PATENT DOCUMENTS

| | | | |
|---|---|---|---|
| 1,886,159 | 11/1932 | Brown | 251/273 |
| 2,160,536 | 5/1939 | Buning | 251/273 |
| 2,720,219 | 10/1955 | Grove et al. | 251/210 |
| 3,084,903 | 4/1963 | Parks | 251/332 |
| 3,188,049 | 6/1965 | Zawacki et al. | 251/282 |
| 3,290,002 | 12/1966 | Self | 251/332 |
| 3,318,577 | 5/1967 | Banks | 251/332 |
| 3,356,335 | 12/1967 | Koch et al. | 251/282 |

Primary Examiner—H. Jay Spiegel

[57] ABSTRACT

A New Three Stage 15,000 p.s.i. Balanced Valve, controlling fluid flows and pressures equally well in either direction, giving dependable leak proof operation with a very low control force.

The first stage acts to gradually cut off the flow as a metering pin enters the orifice, the second stage seat is a standard 45 degree poppet valve closing directly after the metering pin cuts off the flow, the third stage positive shut off is made by teflon under extreme pressure forming a cut off point between the metering pin and the inside walls of the orifice, just below the 45 degree poppet valve.

This needed high contact pressure is created by a unique pressure multiplier, a system in which the metering pin causes the self lubricated teflon to be telescoped smoothly without obstruction into a slightly smaller confinement while the valve is being fully closed. A coil compression spring is used to restore the teflon back into the low pressure confinement.

This balanced valve has attained a one hundred percent balanced closure member by adding a pressure compensating spindle on the opposite end of the balanced closure member and extending it out through a moving seal to the atmosphere.

3 Claims, 3 Drawing Figures

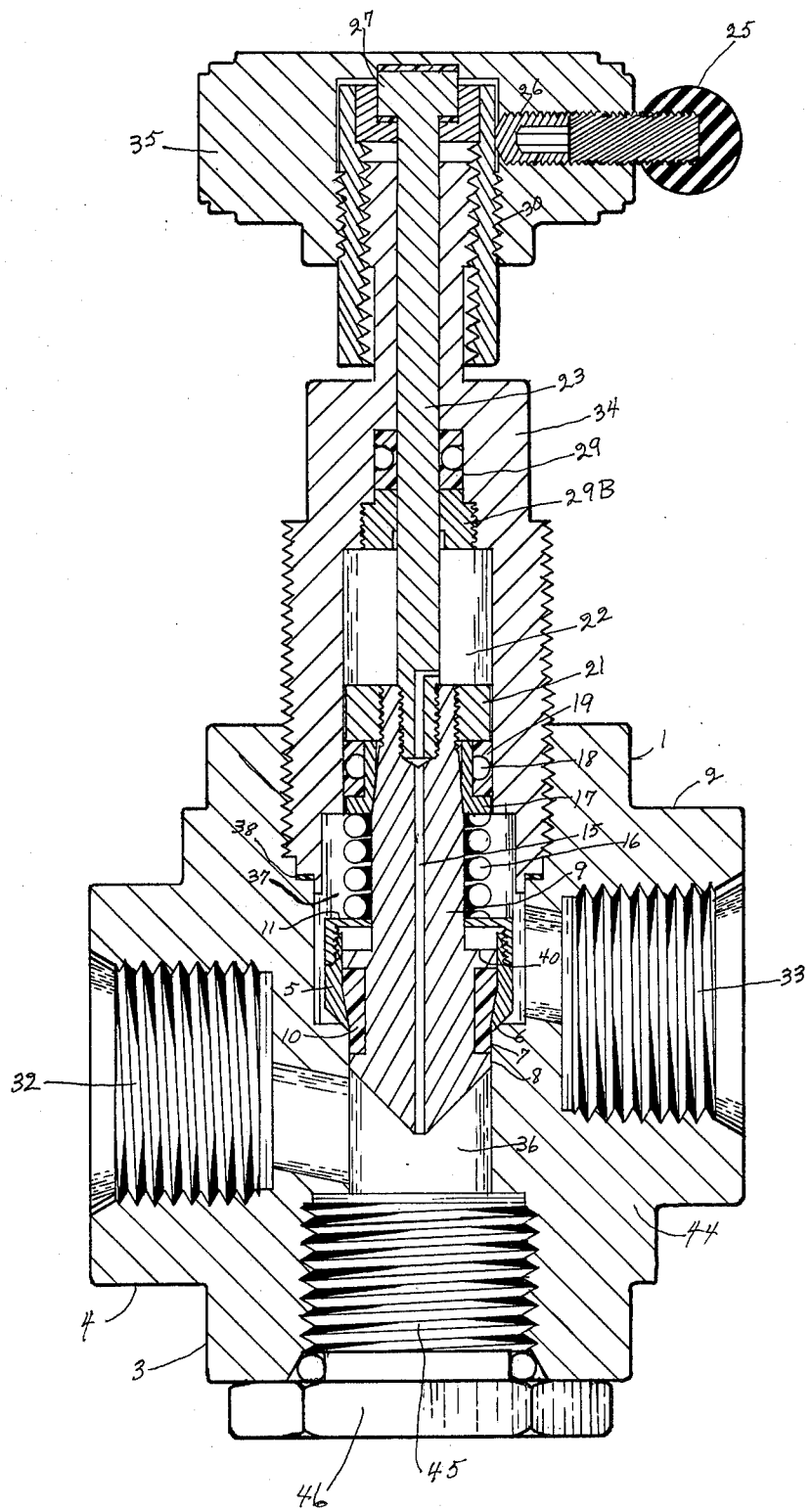

HIGH PRESSURE, THREE STAGE, BALANCED VALVE

This new three stage, balanced, control valve has dependable leak proof operation at all pressures up to 15,000 pounds per square inch and higher, controlling fluid flows equally well in either direction. The 100% balanced closure member allows the valve to retain the proper seat contact pressure at all working pressures regardless of direction of flow. The new moving seals in this valve are self compensating for both pressure and wear, retaining the proper contact pressure at all times. The control force to operate this valve is very low, less than 20 inch pounds for a ⅜ inch orifice valve. This is the first valve ever to meet the above specifications at these elevated pressures.

The principal object of this invention therefore is to disclose a valve meeting the above specifications.

A further object of this invention is to eliminate meter pin galling and leaking by not having the travel of the metering pin stopped by the slight angle of the metering pin contacting the orifice.

A further object of this invention is to provide a valve in which the travel of the metering pin is stopped only when the proper seat contact pressure of both the poppet valve and the soft seat valve have been reached.

A further object of this invention is to provide a valve in which the proper seat pressure of a second stage metal poppet valve is transferred by a hydraulic action to the proper contact pressure of the third stage soft seat.

A further object of this invention is to give the balanced closure member a 100% balance, this is done by adding a pressure compensating spindle on the lower end of the balanced closure member and extending it out through a moving seal to the atmosphere. This 100% balance gives the valve the ability to maintain the proper seat contact pressure at all pressures regardless of the direction in which the pressure is applied.

A further object of this invention is to provide a high soft seat contact pressure with a very low energy force. This is accomplished by useing a unique contact pressure multiplier.

A further object of this invention is to disclose a closure member in which the soft seat material is completely confined at all times with suitable high tensile strength metals, regardless of whether the valve is open or closed, or the soft seat is being transferred into or out of the smaller high pressure confinement. This is insured by incorporating a compression coil spring to return the teflon back into the low pressure confinement when the valve is opened, and not depending on the resiliency of the teflon to do the job.

A further object of this invention is to provide a valve control handle which employs a swivel on the control spindle allowing the control spindle and the closure member to move up and down without turning. This control handle also has a knob attached to the greater diameter giving a non-slip grip, this knob also assists in indicating the position of the closure member.

Further objects, advantages and capabilities will be apparent from the description and disclosure in the drawings, or may be comprehended or are inherent in the device.

At 15,000 pounds per square inch, no leaks can be tolerated, for this reason we do not depend on a metal metering pin or the standard 45 degree poppet valve, but rather the combination of both with a special third stage soft seat for the final leak proof shut off. The design of this seat and closure member assembly is such that the soft seat material need not be resilient or compressible, it does need to be slightly flowable under pressure. This design makes it possible to use a wide range of soft seat materials, however, being thoroughly familiar with the better qualities of Polytetrafluoroethylene, commonly sold by the trade name "Teflon" it will be used in this disclosure. Exacting tests have established that a teflon valve seat must have a contact pressure of 1300 pounds per square inch to insure a leak proof shut off. At lower contact pressures wire leaks will occur, the flow rate of these leaks will range from the most minute leak possible to detect to a flow of one or two CCs per minute, the lower the contact pressure the higher the flow. No leaks being tolerable, it is imperative that this high seat contact pressure be attained at all working pressures. This pressure is attained by a contact pressure multiplier. This gives the contact seat the necessary pressure with very little force expended.

It is well to bring to mind the tremendous force we are dealing with at these elevated pressures. An unbalanced valve having a ⅜" orifice will have a spindle thrust of 4,602 pounds at a pressure of 15,000 pounds per square inch, a ¼" spindle alone at 15,000 pounds per square inch will have a thrust of 735.3 pounds; This thrust alone is twice too high for the proper operation of a hand operated valve. This disclosure does not fight these forces but rather cooperates with them. This is accomplished by the precision balancing, allowing these forces to assist in the movement of the closure member in both opening and closing, at the same time insuring the proper seat contact pressure at all working pressures, the proper seat contact pressure is created by the control force only.

Now in reference to the three vertical, cross sectional drawings of the valve structure, embodying the invention:

FIG. 1, The valve being shown in the closed position.

Figure 2:
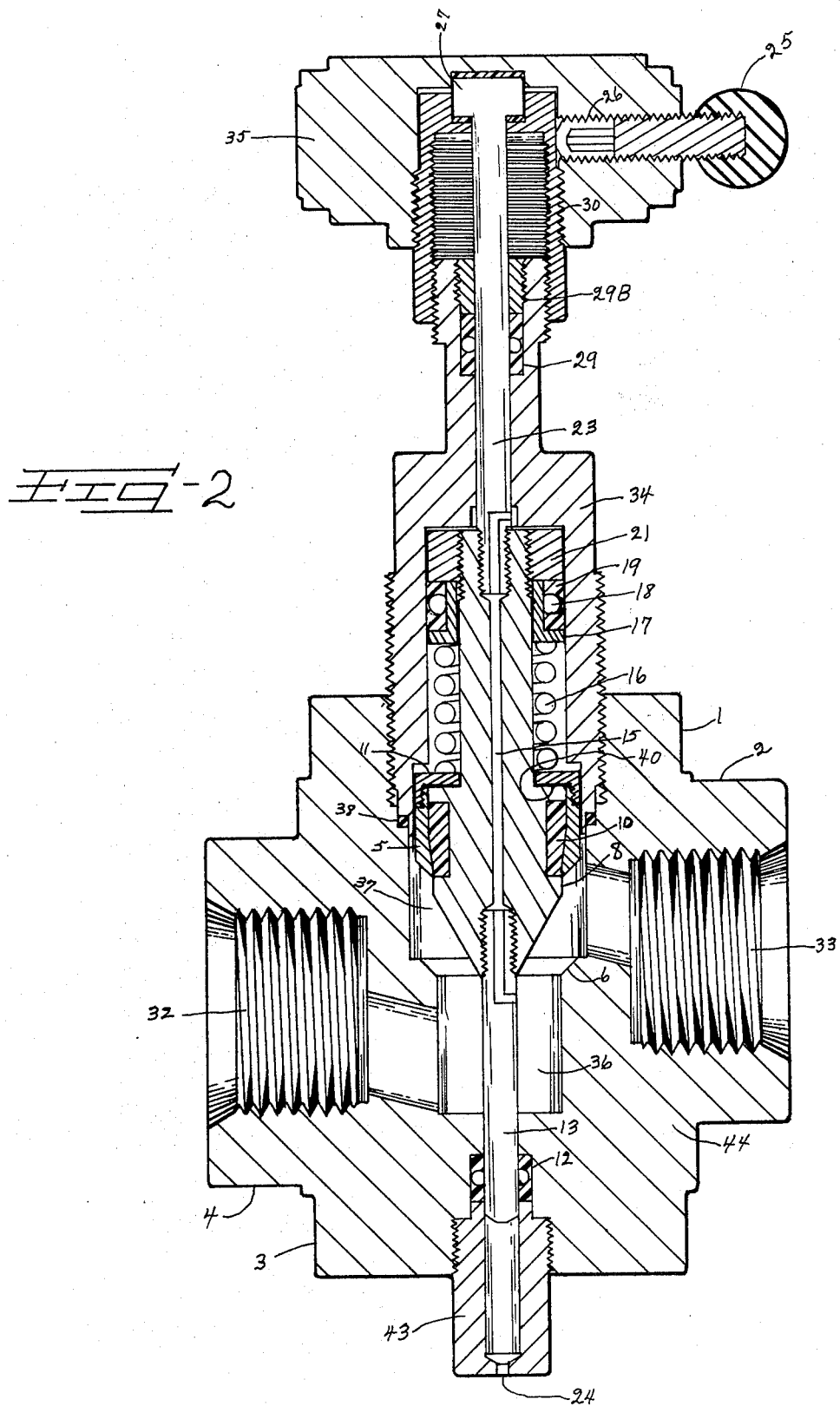

FIG. 2, The same valve shown in the open position.

FIG. 3, The same balanced valve, but without the pressure compensating spindle. This valve has three supply line connecting ports, and is capable of handling large orifice valves having working pressures around 6,000 pounds per square inch, and is shown in the closed position.

In the example of the embodiment of the invention herein disclosed, in FIGS. 1 and 2, the improved valve structure employs a body 44 having four bosses. Boss 1 is drilled and threaded to receive the spindle barrel 34 and is counter bored to form the seat for the spindle barrel seal 38, the forty-five degree poppet valve seat and the flow control orifice chamber 36.

Bosses 2 and 4 are drilled and threaded to form ports 32 and 33 which will suitably accept fluid supply conduits. Port 32 is drilled to communicate with the flow control orifice chamber 36. Port 33 is drilled to communicate with chamber 37 which is just above the forty-five degree poppet valve seat 6.

Boss 3 is drilled and counter bored to accomodate the compensating spindle 13, the moving seal 12 and the threaded retaining bushing 43 which is ported to the atmosphere at 24. All counter bores, whether in the body or in the spindle barrel, are all coaxial with the spindles.

The spindle barrel 34 is counter bored from the lower end to accomodate the balanced closure member assembly, the upper end is drilled and counter bored to accomodate the control spindle 23, the moving seal 29 and the threaded retaining bushing 29b. The outside diameter of the upper portion of the spindle barrel 34 is reduced and threaded, mating with the thread in the inside diameter of the control handle 35. The control handle 35 is fashioned with a swivel 27 formed on the upper end of the control spindle 23, this allows the control handle 35 to turn without turning the control spindle which raises and lowers the closure member assembly. This control handle 35 has an assembly thread 30 which allows the swivel 27 to be adjusted for wear and held in adjustment by set screw 26. The control handle 35 also has a small knob 25 attached to the greater diameter of the handle 35, giving the handle a non slip grip and also helping to determine the number of turns the valve is open or closed.

THE CLOSURE MEMBER ASSEMBLY

The closure member assembly is the unique feature of this valve and includes the control spindle 23, the compensating spindle 13, the elongated metering pin 9, the teflon circular bushing 10, the poppet valve 5, with the retaining cap 11, the compression spring 16, the seal retaining bushing 17, the balance seal 19 with the O-ring 18 and the assembly nut 21; this entire assembly retains a 100% balance at all times regardless of the location of the pressure or the position of the closure member. The control spindle 23 above seal 29 is open to the atmosphere the same as the compensating spindle 13 is open to the atmosphere below the moving seal 12, atmosphere vent shown at 24. The by-pass 15 keeps the same pressure in the balance chamber 22 above the balance seal 19, the same as the pressure below the valve seats 6, 7, & 8, this pressure in the orifice control chamber 36 is always the same as the pressure in the balance chamber 22 regardless of whether the valve is open or closed. When the valve is closed the pressure in port 33 and chamber 37 is balanced between the balance seal 19 and the seats 6, 7 & 8.

OPERATION OF THE SOFT SEAT CONTACT MULTIPLIER

As the valve is closed the poppet valve 5 makes contact with the 45 degree orifice seat 6, the coil spring 16 and the teflon bushing 10 hold the poppet valve closed, as the control handle 35 is turned further down, the metering pin 9 telescopes the lower portion of the self lubricated teflon bushing 10 out of the smooth and slightly conical inside diameter of the poppet valve 5 into the slightly smaller confinement shown in FIG. 1, at 7. The teflon being slightly compressible and flowable under pressure is used as a hydraulic fluid and as it is completely contained in high tensile strength steel, and being gradually telescoped into a slightly smaller confinement creates a high hydraulic pressure of teflon which holds the poppet valve 5 closed and at the same time gives the high contact pressure necessary for the positive seal of the soft seat at 7.

As the valve is opened the coil spring 16 holds the hollow poppet valve 5 closed until the metering pin 9 at 40 makes contact with the retaining cap 11, at this point the teflon 10 has been completely returned to the low pressure confinement in the hollow poppet valve 5, the poppet valve 5 will now open as the spindle 9 continues to rise.

This hydraulic principle of telescoping a portion of the teflon smoothly and gradually into a slightly smaller confinement makes it possible to create large areas of high soft seat contact pressure. This makes it possible to have a large orifice, leak proof, soft seat valve, operating at a very low control force. Without this multiplying feature, only the smaller orifice valves can have this low torque, leak proof operation.

FIG. 3 shows the same balanced valve, only modified for semi high pressures, operating successfully at all working pressures, up to and including 6,000 pounds per square inch. At these pressures the compensating spindle is not needed. This valve has a third supply port 45 added to the valve. This allows the valve to be changed from a globe valve to an angle valve. This change is made by changing the plug 46 from one port to another. When the plug 46 is in port 32 the valve is an angle valve, when plug 46 is moved to port 45 the valve becomes a globe valve.

It is believed that it will be clearly apparent from the above description and the disclosure in the drawings that this invention embodies many unique features and improvements in the construction of high pressure, leak proof valves.

Having thus described my invention, I claim:

1. A soft seat contact multiplier in combination with a three stage high pressure shut off, comprising, (a) a second stage tapered poppet valve seating surface forming a smooth entrance to a circular smooth walled flow control orifice, (b) an elongated metering pin having a metering portion and a first stage shut off portion on a lower portion of said pin and being movable axially into and out from said flow control orifice, (c) just above the shut off portion of said metering pin, a circular horizontal groove of ample width is cut in the outside diameter of said metering pin, the upper wall of said groove having an outside diameter a few thousandths of an inch larger than the outside diameter of the lower groove wall, (d) a teflon bushing under pressure is carried in said groove, the lower portion of the outside diameter of said teflon bushing being slightly conical, the outside lower end diameter of said teflon bushing conforming to said lower groove wall diameter and tapering up to an upper straight sided portion of said teflon bushing, having an outside diameter conforming to the outside diameter of said upper groove wall; (e) a second stage tapered poppet valve formed on the lower end of a heavy walled hollow cylinder, the inside diameter of said hollow cylinder conforming to and covering the outside diameter of said teflon bushing and said upper groove wall; (f) the remaining length of said elongated metering pin, above said upper groove wall is reduced in diameter and a hollow retaining cap is slipped over said metering pin and attached to the upper portion of said hollow cylinder; (g) a coil compression spring is slipped over said metering pin and compressed between said retaining cap and an assembly nut on the upper end of said metering pin; (h) the first stage takes place as said metering pin moves down into and closes said control orifice, (i) further downward movement of said metering pin causes said second stage poppet valve to close with said tapered poppet valve seat; (j) said metering pin co-acting with said compression spring allows said metering pin to continue on downward smoothly telescoping, without distortion, a lower portion of said teflon bushing into said flow control orifice, the diameter of said orifice being a few thousandths of an inch smaller than the major diameter of said teflon bushing, the hydraulic advantage present in this telescoping action multiplies the teflon contact pressure in pounds per square inch many times over that of the downward force in pounds per square inch, creating the needed high seat contact pressure on the inside walls of said flow control orifice for the third stage positive shut off.

2. A valve as recited in claim 1, with a valve control handle having an adjustable swivel in the a top center region thereof and a non-slip grip knob on the outside diameter, said handle is in the shape of a short upright cylinder, the lower end of said cylinder is center drilled and counter bored to form a chamber having an inside top surface for receiving a teflon thrust washer, and the upper portion of the round flat heat of the control spindle, the lower wall of said chamber is threaded to receive a threaded adjustment member having a top surface center drilled and counter bored to receive said control spindle, a teflon thrust washer and the lower portion of the round head of said control spindle, said threaded adjustment member is also center drilled from the bottom and threaded, said thread being the control thread and mating with the control thread of the valve, the major out side diameter of said handle is drilled and threaded into said chamber to accomodate a set screw securing said threaded member, a small round ball on a threaded stud is screwed into the same thread as that of the set screw.

3. A high pressure, three stage, balanced valve, comprising, (a) a valve body having a cylindrical wall structure defining a central valve closure member assembly chamber communicating with a first supply port, said chamber having a bottom concentrically counter bored, forming a 45 degree poppet valve seating surface providing a smooth entrance to a smooth walled circular orifice control chamber communicating with a second supply port, said supply ports communicating with each other when valve is open; (b) a barrel member detachably received in the upper portion of said central chamber, said barrel member having a chamber centrally disposed therein, defining an upper balance chamber which allows a balance seal, mounted on the upper portion of said closure member assembly to be moved up and down therein, the remaining upper portion of said barrel member is concentrically drilled and fashioned to accommodate a control spindle and a control spindle moving seal; (c) an elongated metering pin having said control spindle attached to the upper end and extending up through said balance chamber, through said moving seal to atmosphere, a compensating balance spindle is centrally attached to the lower end of said metering pin and extending out through said orifice control chamber through a moving seal and out to atmosphere; (d) a pressure communicating by-pass is provided between said upper balance chamber and said lower orifice control chamber; (e) said metering pin having a circular horizontal groove of ample width formed in the outside diameter, just above the shut-off portion of said pin, the upper wall of said groove being a few thousandths of an inch larger in outside diameter than the outside diameter of the lower groove wall; (f) a self lubricating teflon bushing under pressure is carried in said groove, the lower portion of the outside diameter of said teflon bushing being slightly conical, the outside lower end diameter of said teflon bushing conforming to said lower groove wall diameter and tapering up to an upper straight sided portion of said teflon bushing having an outside diameter conforming to the outside diameter of said upper groove wall; (g) a 45 degree, second stage poppet valve formed on the lower end of a heavy walled hollow cylinder, the inside diameter of said hollow cylinder conforming to and covering the outside diameter of said teflon bushing and said upper groove wall; (h) the remaining length of said elongated metering pin, above said upper groove wall is reduced in diameter and a hollow retaining cap is slipped over said metering pin and attached to the upper portion of said hollow cylinder; (i) a coil compression spring is slipped over said metering pin and compressed between said retaining cap and the balance seal assembly; (j) the first stage closure takes place when said metering pin moves down, closing the control orifice, further downward movement of said metering pin causes said second stage poppet valve to close with said 45 degree poppet valve seat, said metering pin co-acting with said compression spring allows said metering pin to continue down smoothly telescoping a lower portion of said self-lubricating teflon bushing into said control orifice, the diameter of said orifice being a few thousandths of an inch smaller than the major diameter of said teflon bushing, the hydraulic advantage in said telescoping multiplies the contact pressure per square inch of said teflon bushing many times over that of the downward control force in pounds per square inch, supplying the needed high seat contact pressure on the inside walls of said control orifice for the third stage final and positive shut off.

* * * * *